Oct. 22, 1968 G. A. KORTE 3,406,890
INERTIA WELDERS
Filed April 1, 1966
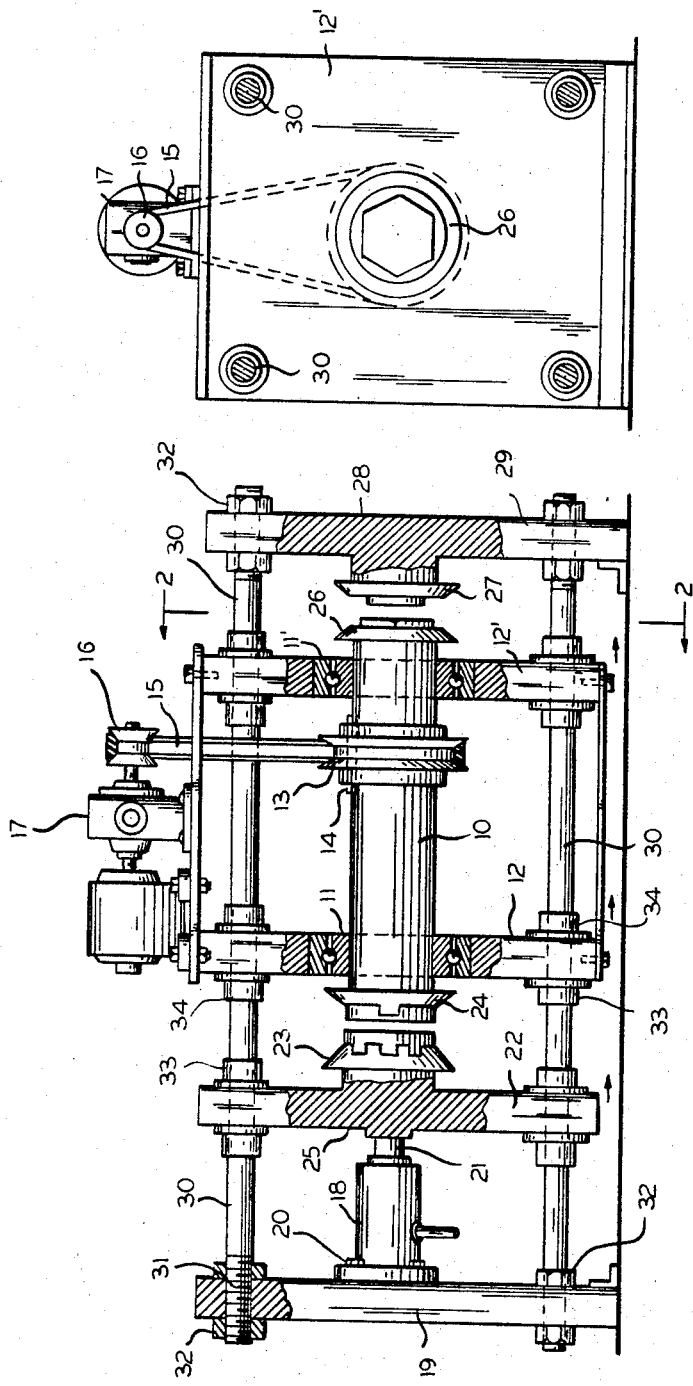
INVENTOR
GERALD A. KORTE
BY *Irwin C. Alter*
ATTORNEY

United States Patent Office 3,406,890
Patented Oct. 22, 1968

3,406,890
INERTIA WELDERS
Gerald A. Korte, 14330 Regis St.,
Brookfield, Wis. 53005
Filed Apr. 1, 1966, Ser. No. 539,552
4 Claims. (Cl. 228—2)

ABSTRACT OF THE DISCLOSURE

An inertia welder having a rotatable shaft mounted between a pair of movable standards. Spindles or chucks are located at each end of the shaft. A third hydraulically actuated standard at one end of the shaft has a workpiece holding device mounted thereon coaxial to the shaft. A stationary standard member at the other end of the shaft has another workpiece holder mounted thereon coaxial to the shaft, making it possible to weld two units at a time. When the hydraulically actuated standard is moved so that the workpiece it holds presses against the workpiece mounted at one end of the shaft, the shaft and the other workpiece held by it is forced against the workpiece mounted on the stationary standard member.

---

My invention relates to inertia welders, and more particularly to a device that provides balanced pressure on the spindles to eliminate wear.

The prime object of my invention is to provide a device that is applicable to inertia welders, hydraulic press welders, friction welders, diffusion bonders, or the like.

Another object of my invention is to provide a means of performing two welds, or bonding operations at the same time.

Still another object of my invention is to provide a means of the character described that will save time, labor bearing wear, as well as decreasing the time of the welding or bonding operation.

A further object of my invention is to provide a device that is efficient, and in which the structure is simple and the power requirements are low.

It is manifest to anyone familiar with welding, that inertia welding has proven its potentials in many operations. It has been successfully employed in mass production, and it is the prime purpose of my invention to provide a device that will double the production when welding a plurality of products, or parts.

Other and further objects of my invention will become more apparent as the description proceeds when taken in conjunction with the drawings, in which:

FIGURE 1 is a schematic cross-sectional view of the device, illustrating the component parts constituting my invention, and FIGURE 2 is a cross-sectional view of the assembled device shown in FIG. 1, taken at the line 2—2 in FIG. 1.

Similar characters of reference indicate corresponding parts throughout the several views, and referring now to the same, the character 10, indicates a shaft supported by bearings 11 and 11', disposed within two slidable standards or vertical members 12 and 12' respectively. The shaft 10 is equipped with a pulley shown as 13, mounted onto the shaft 10 and keyed thereto at 14.

The pulley 13 is rotated by means of a belt 15, leading from a drive pulley 16 forming a part of the driving unit 17, which may be a conventional motor, in combination with a clutch, brake arrangement and speed reducer such as are known to those skilled in the art.

A hydraulic cylinder 18 connected to a hydraulic pump (not shown), is mounted to the outer frame vertical member 19 at 20, and is equipped with a piston (not shown), having a piston rod 21 extending outward from the cylinder 18 toward the vertical member 22 which supports a fixed work-piece by means of a holding device 23, opposite the spindle shown as 24 for rotating the work-piece. The holding device 23 is shown supported by the piston actuated third movable standard or vertical member 22, and is pushed by the piston rod 21, when actuated by the piston in the cylinder 18. The holding device 23 is mounted in a manner to keep it from revolving while supporting the work-piece.

The vertical member 12' is equipped with the bearing 11' supporting the other end of the shaft 10, onto which the rotary spindle 26 is attached and disposed opposite the holding device 27, shown supported by the outer frame vertical member 29. This holding device 27 is mounted in this manner to keep it from revolving while supporting the work-piece. As shown at 28, the holding device portion of frame 27 can be integral thereto.

All the members 19, 22, 12, 12' and 29 are held in a vertical position, by means of the longitudinal or horizontal rods 30 completing the frame, which rods are shown threaded at their ends 31, and equipped with nuts 32 for engagement with the vertical end members 19 and 29 which are rigidly mounted on a horizontal surface for their rigid support.

In this manner the work-pieces may be clamped between the holding device 23 and 24 on one side of the unit, and the holding devices 26 and 27 on the other side of the unit, enabling the work-pieces to be processed simultaneously, since the pressures and sliding speeds applied to both workpieces are equal and sufficient to melt portions of the workpieces.

From the above description it will become manifest that the device performs the purpose and function of enabling two sets of parts to be welded at the same time, whether the unit is horizontally disposed as shown, or is vertical in its structure. When the piston rod 21 engages the piston actuated vertical member 22, it forces it toward the revolving spindle 24 which is mounted to the shaft 10, which shaft will force the revolving spindle 26 toward the stationary spindle 27.

Although I have shown a specific structure and arrangement of the parts constituting my device, I am fully cognizant of the fact that many changes may be made in the form, shape, and configuration of the parts, and their arrangement without departing from the operation of the device, or the spirit of my invention, and I reserve the rights to make such changes as I may find necessary or convenient, without departing from the scope of my appended claims.

Having thus described my invention, what I claim and desire to secure by Letters Patent of the United States is:
1. A welding device for simultaneously processing two workpieces comprising:
   a rotatable driven shaft, a rotary spindle at each end of said shaft for holding workpieces,
   a pair of spaced apart vertical members journalling said shaft,
   a plurality of horizontal members supporting said vertical members and retaining them in a vertical position,
   said vertical members being slidably mounted on said horizontal members,
   a pair of vertical end members having said horizontal members protruding therethrough and being on each end of said device and having said vertical end members therebetween, a piston actuated vertical member slidably mounted on said horizontal members, and disposed between one of said end members and one of said vertical members,
   said piston actuated vertical member having a holding device extending therefrom and in alignment with one of said rotary spindles, said holding devices for holding workpieces to be welded to said rotary spindle held workpieces by the pressure and friction caused when said piston actuated vertical member is forced toward said one rotary spindle, said other vertical end member having a holding member extending therefrom and in alignment with said other rotary spindle for holding workpieces to be welded to the other of said rotary spindle held workpieces when said piston actuated vertical member is forced toward said one rotary spindle to cause said rotatably driven shaft to be forced towards said other vertical end member to apply pressure and friction between the said workpieces whereby workpieces can be simultaneously welded at each end of said rotatably driven shaft when said piston actuated end member is actuated.

2. A welding device, as defined in claim 1, wherein said vertical members are rigidly associated with each other, whereby movement of said one of said rigid supports causes movement of the other one.

3. A welding device, as defined in claim 2, wherein a hydraulic piston actuating means having a piston is interposed between said one end member and said piston actuated vertical member, said hydraulic piston actuating means having one end attached to said one end member and its piston attached to said piston actuated vertical member, whereby actuation of said piston causes movement of said vertical member.

4. A welding device, as defined in claim 2, wherein a hydraulic piston actuating means having a piston is interposed between said one end member and said piston actuated vertical member, said hydraulic piston actuating means having one end attached to said one end member and its piston attached to said piston actuated vertical member whereby actuation of said piston causes movement of said vertical member.

References Cited
UNITED STATES PATENTS

| | | | |
|---|---|---|---|
| 3,238,612 | 3/1966 | Herman | 228—2 |
| 3,314,583 | 4/1967 | Roberts | 228—2 |
| 3,134,278 | 5/1964 | Hollander | 228—2 |

RICHARD H. EANES, Jr., *Primary Examiner.*